United States Patent [19]

Löhr et al.

[11] 4,352,568

[45] Oct. 5, 1982

[54] TWIN-SCREW MACHINE WITH SCREWS ROTATABLE IN THE SAME DIRECTION

[75] Inventors: Karl-Dieter Löhr, Alpen; Martin Ullrich, Leverkusen; Erhard Tresper, Krefeld, all of Fed. Rep. of Germany

[73] Assignee: Bayer Aktiengesellschaft, Leverkusen, Fed. Rep. of Germany

[21] Appl. No.: 248,118

[22] Filed: Mar. 27, 1981

[30] Foreign Application Priority Data

Apr. 16, 1980 [DE] Fed. Rep. of Germany ....... 3014643

[51] Int. Cl.$^3$ .............................................. A21C 1/06
[52] U.S. Cl. ...................... 366/84; 366/297; 366/318
[58] Field of Search .............. 366/84, 83, 85, 86, 366/97, 297, 298, 299, 318; 425/204, 208, 209

[56] References Cited

U.S. PATENT DOCUMENTS

| | | | |
|---|---|---|---|
| 3,749,375 | 7/1973 | Hermann | 366/83 |
| 3,856,278 | 12/1974 | Eisenmann | 366/84 |
| 4,299,499 | 11/1981 | Buchheit | 366/85 |

Primary Examiner—Edward J. McCarthy
Attorney, Agent, or Firm—Sprung, Horn, Kramer & Woods

[57] ABSTRACT

A twin-screw machine used for treatment of plastics in which the screw shafts are fitted with eccentrically arranged kneading discs, the clearance $\delta$ between the kneading discs and the inner wall of the machine housing being greater than the constant clearance s between the particular adjacent kneading discs, and the eccentricity e, which is in each case of like orientation, between the axis of rotation and the central point of the kneading disc being greater than zero and less than half the absolute value of the difference between the housing and disc diameters minus the clearance s.

3 Claims, 4 Drawing Figures

TWIN-SCREW MACHINE WITH SCREWS ROTATABLE IN THE SAME DIRECTION

BACKGROUND OF THE INVENTION

The invention relates to a twin-screw machine, the screws of which can rotate in the same direction, for melting, mixing, dispersing, shearing and imparting energy, consisting of a housing which has a figure-eight cross-section and contains circular eccentrically arranged kneading discs which can be rotated.

Circular eccentric discs are known wherein the discs are displaced relative to one another in a spiral staircase fashion and are fixed to shafts running along the two axes of the circular sections of the housing, the eccentric discs almost touching one another and the wall of the housing along a wavy line.

The disadvantages of these discs is that, during conveying and melting, solid polymers are gripped by the eccentric discs, so that the disc can be subjected to loads directed to one side, which can lead both to a high content of abraded metal in the material and to severe wear on the machine. This is in contrast to the balanced forces which, as a result of self-centering by radial forces uniformly distributed around the periphery, otherwise arise in twin-screw machines with screws which can rotate in the same direction. Furthermore, in the plastic state, the processed material escapes axially from the squeezing effect. Most of the material which partly or completely fills up the space is thereby withdrawn from the shearing stress actually intended, while a small portion is overstressed.

SUMMARY OF THE INVENTION

The main object of the present invention is to provide a screw machine, with low wear, for plasticizing under conditions which do not harm the material while subjecting the entire volume of material to uniform shearing stress.

According to the invention, this object is achieved by a machine wherein: the clearance ($\delta$) between the eccentric discs and the wall of the housing is greater than the clearance (s), which is constant during the rotation, between the two kneading discs; and the eccentricity (e), which is in each case of like orientation, from the central point of the housing to the central point of the kneading disc is greater than zero and less than half the absolute difference between the two diameters ($d_h$, $d_e$) minus the clearance (s):

$$o < e < \frac{|d_h - d_e|}{2} - s$$

It is surprising to one skilled in the art that, by altering the already known process, but at a comparable volume of the machine, the same speed of rotation and a corresponding throughput, the quality of the mixture and the uniformity of comminution of solid particles or agglomerates is significantly improved. This improvement is surprising given that one would expect a loss in quality, since self-cleaning of the walls of the housing is dispensed with.

While a clear open screw channel is present and thus intensive axial conveyance of the entire mass is provided in the apparatus which is already known, the new device forces the product paths perpendicular to the conveying direction to be longer. Greater rearrangement of part amounts, together with an improved mixing effect, are thereby achieved with virtually the same average residence time. The device according to the invention provides another advantage in the field of melting. The envisaged opening of the groove gap diminishes the compressive and radial forces effective between the surfaces of the solid and of the metal, in favor of shearing forces. The material to be processed is thereby melted more uniformly and under more gentle conditions and metallic contact between the surfaces of the screws and of the housing is avoided. As a result there is less wear and a longer life of the apparatus is achieved.

In a particular embodiment, single-flight or multi-flight screw threads are combined with zones of kneading discs, the free space cross sectional area between the kneading discs and housing being reduced in each case relative to that of the screw threads.

A more concentrated filling and a more intense compression of the product are achieved by reducing the cross-sectional area of the product in the region of the kneading discs relative to that in the region of the screw thread.

In another embodiment, zones of kneading discs are combined with zones of eccentric discs which almost scrape the walls.

This device combines the mixing and kneading advantages of the eccentric zone according to the invention with the good conveying properties of known eccentric discs which scrape the walls.

An embodiment of the invention and is described in more detail below is shown in the drawings wherein:

DETAILED DESCRIPTION OF THE INVENTION

Figure 1:
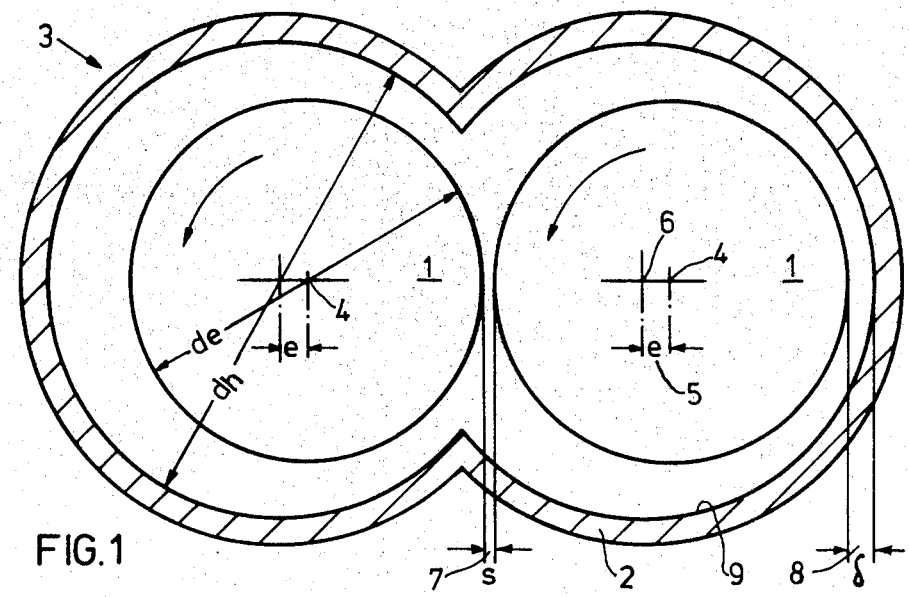
FIG. 1 shows a cross-section through the kneading disc and housing according to the invention.

FIG. 1 shows two circular kneading discs 1 each having a diameter de in a housing 2, the cross-section of the inside of which consists of two intersecting circles in the form of a figure eight labelled 3 and each having a diameter $d_h$. The central points 4 of the kneading discs 1 are displaced in one direction by an eccentricity (e) 5 relative to the central points 6 of the housing circles. The clearance (s) 7 between the kneading discs 1 is constant, while the clearance ($\delta$) 8 between the kneading discs 1 and the wall 9 is always greater than (s) and depends on the rotation conditions of the discs 1.

Figure 2:
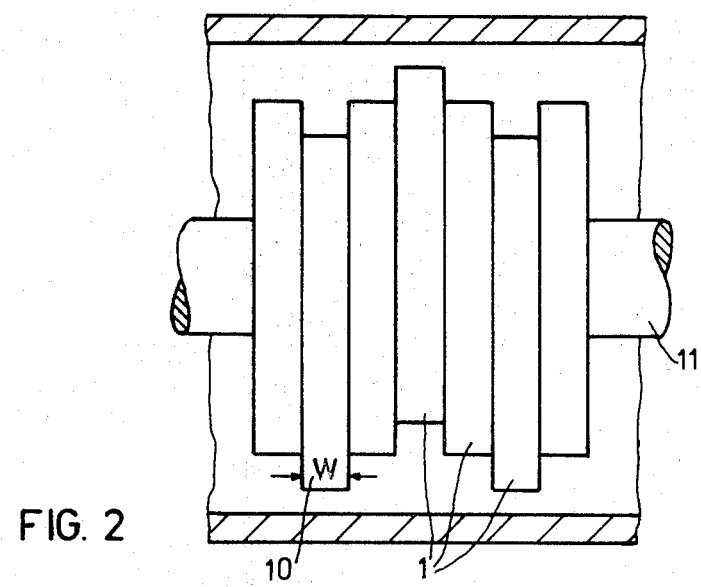
FIG. 2 shows a longitudinal section through the kneading disc according to the invention.

FIG. 2 shows a longitudinal section of the kneading discs 1 which rotate about the shaft 11 and wherein the ratio of the width (W) 10 to the diameter of the kneading disc ($d_e$) 1 is from 0.05 to 5, preferably from 0.1 to 1.

Figure 3:
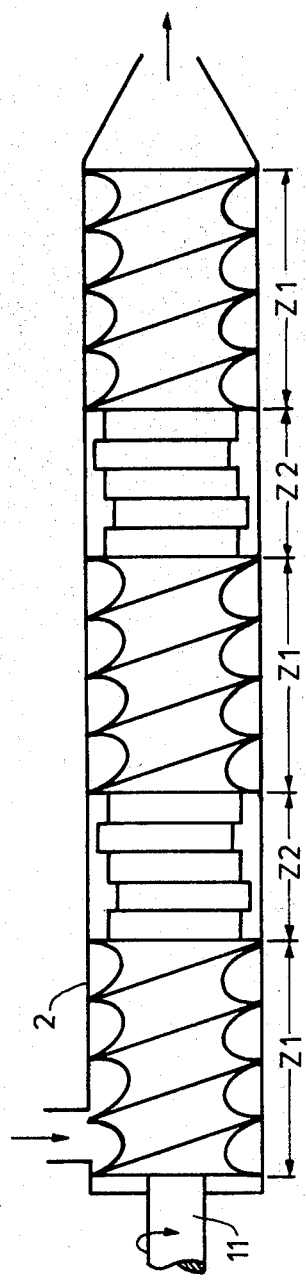
FIG. 3 is a schematic representation of another embodiment according to the present invention.

FIG. 3 shows another embodiment of the present invention wherein zones Z1 of single flight or multi flight screw threads are combined with zones Z2 of kneading discs. As can be seen therein, the free cross-section between the kneading discs and the housing 2 is reduced in each case relative to that of the screw threads of the screw zones Z1.

Figure 4:
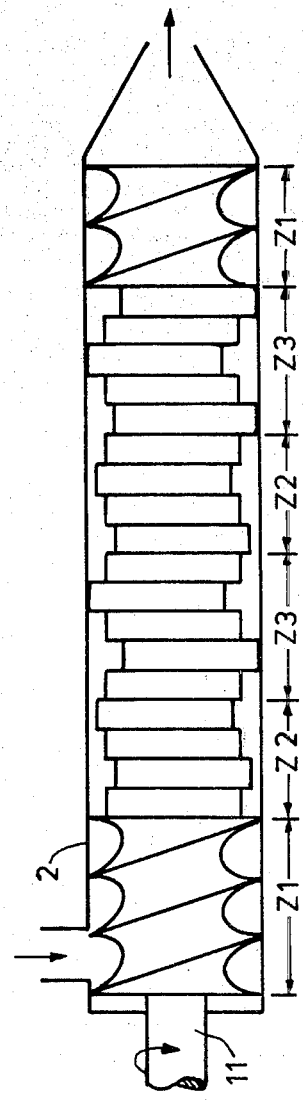
FIG. 4 is a schematic representation of still another embodiment of the present invention.

In FIG. 4, another embodiment is shown wherein zones Z2 of kneading discs are combined with zones Z3 of eccentric discs which almost scrape the inner walls of the housing 9. This device combines the mixing and kneading advantages of the eccentric kneading zones according to the invention with the conveying properties of known eccentric discs which scrape the walls of the housing.

EXAMPLE

The following table shows the results for a twin-screw machine using the same housing wherein the values listed in the last two columns give a particularly good yield. Screws of this design have been employed for plasticizing and for coloring thermoplasts which are sensitive to heat, for example ABS or rubber-modified copolymers.

| | | | | | | |
|---|---|---|---|---|---|---|
| Circular diameter of the housing | $d_h$ | [mm] | 57 | 57 | 57 | 57 |
| Kneading screw diameter | de | [mm] | 47.5 | 47.5 | 47.5 | 47.5 |
| Distance between the axes of rotation of the kneading discs | A | [mm] | 48 | 48 | 48 | 48 |
| Clearance between the kneading discs | s | [mm] | 0.5 | 0.5 | 0.5 | 0.5 |
| Clearance between the kneading disc and the wall | $\delta$ | [mm] | 0.6 | 4.65 | 1.5 | 3.5 |
| Eccentricity | e | [mm] | 4.15 | 0.1 | 3.25 | 1.25 |
| Width of discs | W | [mm] | 5 | 30 | 10 | 20 |

It will be appreciated that the instant specification and claims are set forth by way of illustration and not limitation, and that various modifications and changes may be made without departing from the spirit and scope of the present invention.

What is claimed is:

1. In a twin-screw machine of the type wherein the screws are rotatable in the same direction for melting, mixing, dispersing, shearing and imparting energy, in a housing having a figure-eight cross-section and containing circular eccentrically arranged rotatable kneading discs, the improvement wherein: the clearance $\delta$ between the eccentric discs and the inner wall of the housing is greater than the constant clearance s between two adjacent kneading discs and the eccentricity (e) at each side of the housing from the central point of the housing to the central point of the kneading disc being greater than zero and less than half the absolute value of the difference between the diameter of the housing and the diameter of the disc minus the clearance s.

2. The twin-screw machine according to claim 1, comprising alternating zones of screw flights and zones of kneading discs wherein the free cross-section between the kneading discs and the housing is reduced for each kneading disc zone relative to that of the screw flight zones.

3. The twin screw machine according to claim 1, further comprising zones of kneading discs and zones of eccentric discs which almost scrape the inner wall of the housing.

* * * * *